(12) United States Patent
Bates et al.

(10) Patent No.: US 8,526,596 B2
(45) Date of Patent: Sep. 3, 2013

(54) CROSS-PROTOCOL UNIVERSAL CALL IDENTIFIER

(75) Inventors: Michael Bates, Bethlehem, PA (US);
Xavier Riley, Penfield, NY (US)

(73) Assignee: Grape Technology Group, Inc., Bethlehem, PA (US)

( * ) Notice: Subject to any disclaimer, the term of this patent is extended or adjusted under 35 U.S.C. 154(b) by 804 days.

(21) Appl. No.: 12/683,576

(22) Filed: Jan. 7, 2010

(65) Prior Publication Data
US 2011/0164737 A1    Jul. 7, 2011

(51) Int. Cl.
*H04M 3/00* (2006.01)

(52) U.S. Cl.
USPC ............. 379/265.02; 379/266.04; 379/279; 379/280

(58) Field of Classification Search
USPC ............. 379/265.02, 266.04, 279, 280
See application file for complete search history.

(56) References Cited

U.S. PATENT DOCUMENTS

| | | | |
|---|---|---|---|
| 6,490,624 B1 | 12/2002 | Sampson et al. | |
| 6,546,003 B1 | 4/2003 | Farris | |
| 6,999,574 B2 | 2/2006 | Baker | |
| 7,369,545 B1 * | 5/2008 | West et al. | 370/354 |
| 2002/0031210 A1 | 3/2002 | Mohn et al. | |
| 2002/0122416 A1 | 9/2002 | Xu et al. | |
| 2002/0160766 A1 | 10/2002 | Portman et al. | |
| 2002/0196919 A1 | 12/2002 | Ruckart et al. | |
| 2004/0229608 A1 | 11/2004 | Isukapalli et al. | |
| 2005/0018829 A1 | 1/2005 | Baker | |
| 2005/0147218 A1 | 7/2005 | Novack et al. | |
| 2005/0148338 A1 * | 7/2005 | Baumeister et al. | 455/455 |
| 2006/0251238 A1 | 11/2006 | Richartz et al. | |

* cited by examiner

*Primary Examiner* — Gerald Gauthier
*Assistant Examiner* — Simon King
(74) *Attorney, Agent, or Firm* — Sofer & Haroun, LLP

(57) ABSTRACT

A method is provided for operating a directory assistance system having a plurality of different network elements operating on different protocols. The method includes receiving, at a first network element, operating on a first operating protocol, an incoming directory assistance call from a caller. A universal call identifier data is then assigned to the call. The call is then transmitted to a second network element, operating on a second operating protocol, wherein the same universal call identifier is accepted by the second network element. A record is generated of the exchange of the call between the first and second network elements based on the assigned universal call identifier data.

19 Claims, 4 Drawing Sheets

INCOMING CALL INFORMATION RECORD 15

| NUMBER DIALED BY REQUESTER 100 | PREFERRED LANGUAGE CODE FIELD 102 | ORIGINATING PHONE NUMBER OF CALLER 104 | REQUESTER SERVICE PROVIDER FIELD 106 | FEATURE CODE 108 |
|---|---|---|---|---|
| UCI FIELD 110 | | | | |

FIG. 2

CALL COMPLETION DATA PACKET 50

- ORIGINATING PHONE NUMBER OF CALLER FIELD — 54
- RD INFORMATION FIELD — 56
- CLOSING PROMPT CODE FIELD — 58
- PRE-ANNOUNCEMENT FIELD — 59
- UCI FIELD — 60

FIG. 3

CROSS-PROTOCOL UNIVERSAL CALL IDENTIFIER

RELATED APPLICATION

This application claims the benefit of priority from U.S. patent application Ser. No. 11/027,576, filed on Dec. 30, 2004, the entirety of which is incorporated by reference.

BACKGROUND

1. Field of the Invention

The present invention is directed to a system and method for delivery of enhanced directory assistance. More particularly, the present invention relates to a system and method for delivery of enhanced directory assistance, utilizing a cross protocol universal call identifier.

2. Description of the Related Art

Enhanced directory assistance systems are used to provide directory assistance (DA) to callers, responding to requests for all types of information including telephone numbers, directions and reservation services. The directory assistance systems currently employed typically employ a number of network elements. Network elements refer to the physical devices within the directory assistance system used to carry out various functions, including internal routing of the calls, interfacing with operators, call completion, data storage, and other such functions.

Examples of network equipment used in directory assistance systems include but are not limited to Lucent 5ESS (network switch), Nortel DMS (voice circuit switches), Cisco Devices AS5400, 6500, 7200, PGW, GSR (eg. network routers), Soft switches (Telica Plexus, Sonus), Session Border Controllers and LAN/WAN switches. Most of these network elements in directory assistance systems may support a number of different protocols used for such tasks as call setup or billing.

A universal call identifier (UCI) is used to track calls within a particular operating protocol. These UCIs are present in most protocols such as Signaling System 7 (SS7) and Session Initiation Protocol (SIP). However, currently UCIs only operate within a single protocol. This is because UCI comes in various lengths and formats, and are thus not portable between protocols.

For example, a directory assistance call to an enhanced directory assistance system may first enter the system via a first network switch using the SS7 protocol, it is then assigned a transaction ID, referred to as a UCI. Within the same network of the directory assistance system, the call could then be transported to another switch using Inter-Machine Trunks (IMT) with the Primary Rate Interface (PRI) protocol, which uses a different UCI than the one provided by the SS7 protocol. From there, the same call could then be sent out of the system to the caller using the SIP protocol, again using a different UCI. In this example, each of the protocols utilize a different UCI. The different UCIs are not related to one another and they are not transferable outside one network element, to other network elements that use different protocols.

Such an arrangement presents problems with troubleshooting individual calls within the directory assistance system, because the system's network uses different network equipment for different functions, each of which may be operating on different protocols. Because of this, system administrators can not easily perform disambiguation of individual calls and connecting of call legs together, when attempting to trace a call pathway through the DA system. Additionally, the different protocols, each using different UCIs, make bill reclamation difficult because the point of call failure can not easily be traced, again because the call legs within the network are difficult to piece together.

OBJECT AND SUMMARY OF THE INVENTION

The present invention looks to overcome the drawbacks associated with the prior art by providing a system and method for propagating a UCI across multiple network elements within a directory assistance system, regardless of the protocols being used by the network equipment.

To this end, the present invention provides for a method for operating a directory assistance system having a plurality of different network elements operating on different protocols. The method includes receiving, at a first network element operating on a first operating protocol, an incoming directory assistance call from a caller. A universal call identifier data is then assigned to the call.

The call is then transmitted to a second network element, operating on a second operating protocol, wherein the same universal call identifier is accepted by the second network element. A record is generated of the exchange of the call between the first and second network elements based on the assigned universal call identifier data.

BRIEF DESCRIPTION OF THE DRAWINGS

For the purpose of illustrating the invention, there are shown in the drawings several forms, which are presently preferred, it being understood, however, that the invention is not limited to the precise arrangements and instrumentalities shown.

FIG. 2 is block diagram of an incoming all record in accordance with one embodiment of the present invention;

FIG. 3 is a lock diagram of a call completion data packet, in accordance with one embodiment of the present invention.

DETAILED DESCRIPTION

Figure 1:
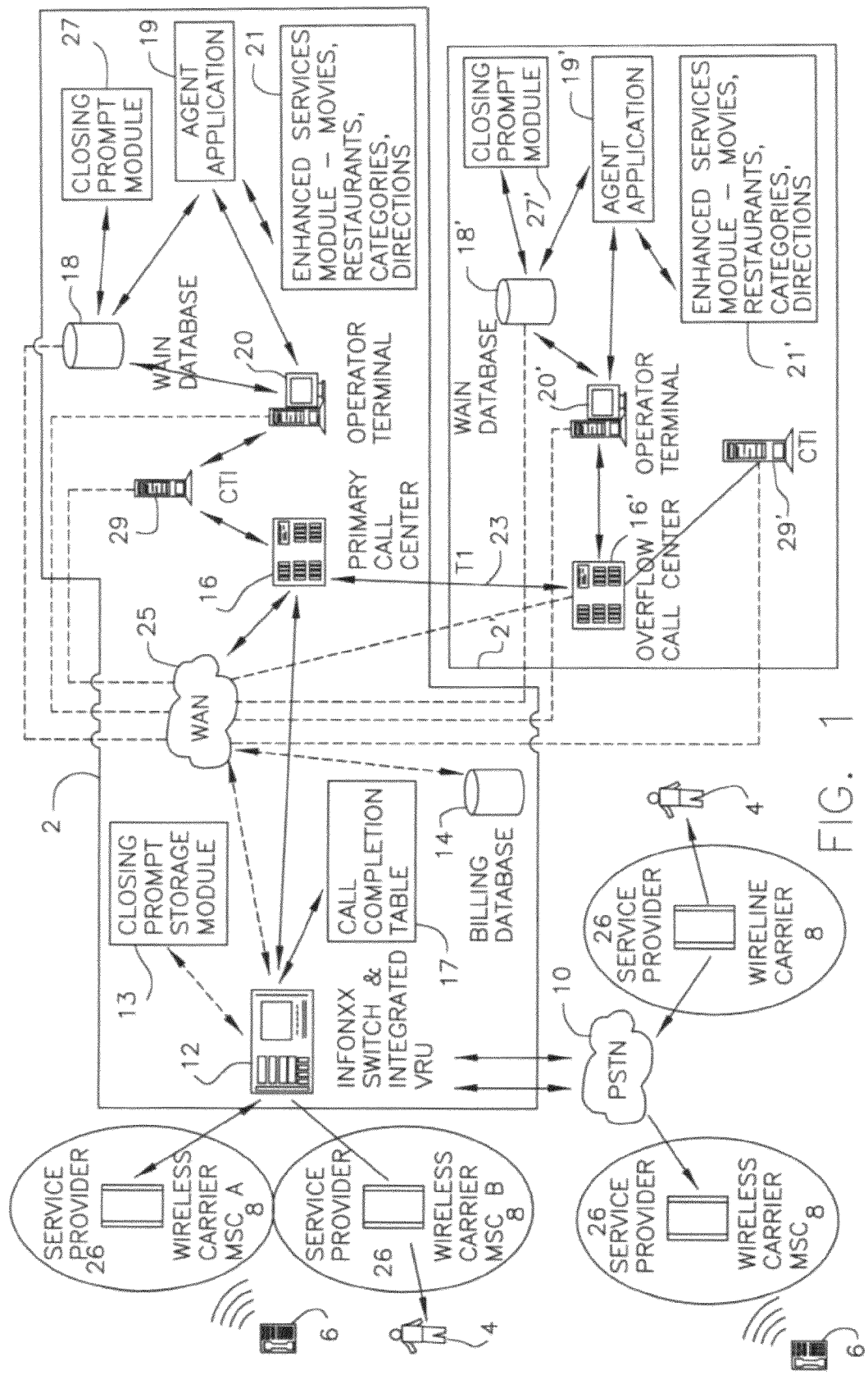
FIG. 1 is a diagram of a communication assistance system of the present invention in accordance with one embodiment of the present invention.

Referring now to the drawings, wherein like reference numerals refer to like elements, there is shown in FIG. 1, a directory assistance system and network 2 in accordance with one embodiment of the present invention. System 2 allows a caller 4 to initiate a communication with system 2 to make a directory assistance request. The request can include but is not limited to obtaining a desired telephone number, connecting a call to that same number, requesting directions or, requesting a particular service such as movie ticket purchase, placing reservations etc. . .

Although many options for requests exist, typical caller 4 calls to system 2 in order to request either a desired telephone number or additionally, request that they be automatically connected to that requested number. The desired connection that caller 4 is requesting is referred to throughout the application as requested device 6. As noted above, requested device 6 and caller 4 are typically using landline telephones or a cellular phones however, requested device 6 and caller 4 are not limited in that respect. Both caller 4 and requested device 6 can be operating on any known communication device including cellular telephones and modems, pagers, PCS phones and modems, RIM Blackberry, wireless PDA, instant messaging devices, SMS devices, VoIP devices and the like.

Although the request of caller 4 may be for many types of services, for the purposes of illustration, caller 4 is referred to throughout as requesting to be connected to a requested device 6, such as a telephone, unless otherwise specified.

Directory assistance system 2 is preferably coupled to one or more service providers 26 directly through a wireless MSC (Mobile Switching Center) 8 or via public switched telephone network (PSTN) 10. It is understood that these forms of connectivity between system 2 and callers 4 and requested devices 6 are only examples of possible arrangements and are in no way intended to limit the scope of the invention. For example, it is contemplated that system 2 may be coupled directly to the internet in order to facilitate VoIP communications directly between caller 4, the customer service representative (explained below), and eventually to requested device 6. However, for the purposes of illustration, system 2 is described in connection with traditional connections via MSCs 8 and PSTN 10.

In general, caller 4 and requested devices 6 communicate with system 2 via mobile switching center (MSCs) 8 and PSTN 10 as shown in FIG. 1. Although not shown, it is contemplated that requested device 6 and caller 4 can communicate with system 2 via a MSC 8 coupled to PSTN 10.

As shown in FIG. 1, system 2 preferably comprises one or more switches 12, (which may include integrated voice response units as well, the VRU may be standalone instead of integrated as described above), billing databases 14, primary call centers 16, requested number databases 18 (which may include wireless apparatus identification number (WAIN) databases), a plurality of operator terminals 20 running agent application 19, enhanced service modules 21 that may be operated by an agent, closing prompt storage module 13, call completion table 17, a wide area network 25, closing prompt modules 27 coupled to agent applications 19, and a computer telephony interfaces 29. In particular, billing database 14 is connected to WAN 25 and can be coupled to any component of system 2. Switches 12 are coupled to Mobile Switching Centers (MSCs) 8 and PSTN 10 as well as primary call center 16. Primary call center 16 is also coupled to at least one operator terminal 20 and database 18.

For the purposes of this application, each of these components described above within directory assistance system network 2 may be collectively referred to as network elements. The following is an overview of the network elements, their role in system 2, and their connections with respect to one another. It is understood that the following description of network elements is intended only as an example of one network system 2. Directory assistance system networks 2, using other similar network elements to provide similar directory assistance services are also within the contemplation of the present invention. Each of the following described network elements include hardware and software elements, each of which may operate on one or more operating protocols.

In a preferred embodiment of the present invention a plurality of directory assistance systems 2 and system 2', illustrated in FIG. 1, can be strategically located in various geographic locations across the country. For example, system 2 or system 2' (call center) can be located in a major metropolitan area spread across the United States or anywhere in the world. Each system 2 is configured to handle the call traffic that is designated for that call center which could include all possible type of calls.

Additionally, as reflected in FIG. 1, each system 2 can be connected to other systems 2'. It is understood that any number of additional directory assistance systems 2 or 2' may be interconnected with one another. This connection can be achieved by the coupling of primary call centers 16 of the various systems 2 via high capacity telephone cables such as T1 lines 23, via WAN 25 or other comparable facilities including PSTN 10 or the internet. It is also in the contemplation of this invention that these connections could be established through the use of a virtual private network (VPN) or other comparable technology.

The links coupling the network components of system 2 together and with service providers 26 via mobile switching center (MSC) 8 and Public Switched Telephone Network (PSTN) 10 can be any known voice and/or data communication technologies, including wide area networking and local area networking communication technologies, for example, digital subscriber lines (DSL), digital T-1s, leased lines, satellite or wireless links, Integrated Services Digital Network (ISDN) circuits, asynchronous transfer mode (ATM), Ethernet, token ring, fiber distributed-data interface (FDDI) and the like.

It is also presumed that the various components of system 2, service providers 26 and PSTN 10 are arranged with appropriate communication hardware interfaces to transmit and receive data across the communication links. For example, wireless service providers 26 may interface directly with system 2 via mobile switching center (MSC) 8 hardware, coupled directly to switch 12 of system 2.

In one example of network element within system 2, switches 12 are provided, which preferably include an integrated voice response unit (VRU). Many functions performed by switches 12 are known to those of ordinary skill in the art and include telephone call routing between trunks, converting one signaling type to another, such as between a digital signaling system, dual-tone multi-frequency (DTMF) signaling, multi-frequency (MF) signaling, ISDN, SS7, etc., and capturing call length and destination data for billing, etc.

As shown in FIG. 1, when a call comes into switch 12, the call is identified by a DNIS which relates to the number dialed by caller 4, so that appropriate data generated by system 2, such as incoming call record 15 (FIG. 2) and call completion data packets 50 (FIG. 3), can be routed to the network elements and then to the correct switch 12 to complete the call, as will be explained in more detail hereinafter.

It is noted that switch 12 is preferably the primary network element for assigning the universal call identifier to be used for a given call, for tracking the call pathway through system 2 as will be discussed in detail below. Switch 12 can be configured to assign a universal call identifier supplied from the MSCs 8 or it may generate its own based on the configuration of the system and the protocols being used by the different network equipments. This is in no way intended to limit the scope of the application, and it is contemplated that other network elements may also be adapted to assign the universal call identifier to a particular call.

Upon the initiation of a call completion, switch 12 is configured to pass the originating phone number of caller 4 and/or the number dialed by caller 4 to MSC 8 or PSTN 10 for delivery to requested device 6. This enables requested device 6 to screen in-bound calls.

Additionally, as shown in FIG. 1, switch 12 maintains an integrated voice response unit for use with certain features such as pre-announcement features or other features requiring a generated voice. For the purposes of this invention, Voice Response Unit (VRU) shall refer to any hardware and software combination that allows for the recording and/or delivery of voice messages. Although only one switch 12 is illustrated in FIG. 1, any number of switches 12 can be used in system 2 to increase the capacity of system 2.

In one embodiment of the present invention, as shown in FIG. 1, another exemplary network element is shown, namely a closing prompt storage module 13, configured to store a variety of closing prompt messages and data. When the switch 12 completes the call from caller 4 to requested device 6, switch 12 can play any one of a variety of closing prompts based on the information received from a call completion data packet 50.

As shown in FIG. 1, billing database 14 is another network element used as the repository for the billing data and includes but is not limited to: records which are preferably comprised of the call date, the call start time, the call end time and the resulting time, i.e. the call length, the originating phone number for caller 4, the completion number for requested device 6 and fields which identify the originating and terminating service providers.

In addition to these fields, billing database 14 may also include reference to the universal call identifier as discussed in more detail below. The billing information is important both for billing reclamation for dropped calls and also for internal system diagnostics, and thus billing database 14 preferably is configured to track and store the universal call identifier for each call handled by system 2 along with its standard calling records recorded by caller 4 ANI (Automatic Number Identifier). The billing data can be accumulated from any of but not limited to, the following: switches 12, ACDs, PBXs, agent application 19 and/or database 18.

Another exemplary network element is primary call center 16 which is generally comprised of hardware and software that accepts inbound calls from switches 12 and distributes the calls to multiple operator terminals 20 using standard Automatic Call Distribution (ACD) technology. Operator terminal 20 interacts with database 18 to search for and retrieve desired numbers or contact information corresponding to requested device 6.

The connection between primary call center 16 and operator terminal 20 is such that voice communication is transmitted directly between the two and data information is transmitted via computer telephony interface 29. This may also be accomplished via in-band signaling, as will be discussed below. Operator terminal 20 is not only connected to database 18 but also to other databases and software application modules as well.

Primary call center 16 can be comprised of one or more processors coupled together in a networked arrangement to accomplish these functions, and can be constructed using known computing technology such as using personal computers, mini or mainframe computing devices, routers, switches and the like. Because the arrangement and operation of primary call centers 16 and 16' are similar, discussion of primary call center 16 is understood to also describe primary call center 16'. It is noted that primary call center 16 tracks all calls that pass though to operator terminals 20 in order to provide records for billing and system 2 diagnostics.

Computer Telephony Interface (CTI) 29 is disposed between call center 16 and operator terminal 20. CTI 29 is configured to route the data portion of an incoming caller 4 call, such as the number dialed by caller 4 and the originating phone number of caller 4 to operator terminal 20, while the voice portion of the call is transmitted directly between call center 16 and operator terminal 20. While not discussed here, it is contemplated within the context of this invention that the data portion of an incoming caller 4 call could be sent to operator terminal 20 using in-band signaling (i.e., with the voice path of the call) as well.

Operator terminal 20 can also be any known computing device capable of receiving and displaying data on its display, including but not limited to a personal computer, UNIX workstation and the like. Although it is preferred that a separate customer service representative telephone be implemented as part of system 2 and coupled to primary call center 16 for communicating with caller 4, operator terminal 20 is not limited to this arrangement.

For example, operator terminal 20 can be arranged to contain an integrated telephone (as shown). In other words, any arrangement that allows a customer service representative to engage in oral communications with caller 4 is sufficient. In addition, although only a single operator terminal 20 is shown, system 2 is not limited to this arrangement. It is contemplated that system 2 is comprised of multiple operator terminals 20 such that more than one customer service representative is available to accommodate the users of system 2. As with primary call center 16, operator terminals 20 preferably track all calls that pass through back to primary call center 16 in order to provide records for billing and system 2 diagnostics.

It is noted that operator terminals 20 described above are exemplary only. For example, operator terminals may also be configured to handle VoIP communications from caller 4 via the interne. In such a situations, operator terminals may be configured to handle any such incoming communications including requests delivered by SMS, e-mail, text/instant messaging etc. . . . , and conduct communications with caller 4 entirely without voice. However for the purposes of illustration, system 2 is described below in conjunction with operator terminals 20 for handling voice communications.

It should be noted that primary call center 16 and its communication with switches 12, operator terminal 20 and database 18 as well as the arrangement and communication between primary call center 16' and switches 12' can be implemented in accordance with the connectivity and communication techniques described in U.S. Pat. No. 6,404,884, issued on Jun. 11, 2002, the contents of which are incorporated herein by reference. In an alternate embodiment of this invention it is contemplated that a caller 4 may interact with an agent using a non-voice method such as, but not limited to: Short Messaging Service (SMS), Wireless Application Protocol (WAP), Live Chat, and Instant Messaging (IM) as will be discussed below.

Agent application 19 platform is used to operate operator terminals 20 and databases 18. This system not only supports the communications between these modules but also prepares call completion data packet 50 that is to be sent to switch 12 to ultimately complete the call.

To create call completion data packet 50, operator terminal 20 and agent application 19 require information to be retrieved from database 18. This data is used to populate the various fields of call completion data packet 50 as discussed in more detail below.

Database 18 is preferably any known database system which can be programmed to store all of but not limited to the following: wireline telephone directory listings, originating service provider 26 of caller 4 listings, WAIN listings and other listings such as providers of goods and services. Furthermore, database 18 may be configured to store universal call identifier information as discussed in more detail below.

Database 18 preferably supports multiple database tables for a voluminous quantity of listings and multimedia data associated with each user or organization that is sponsoring a group of users.

It should be noted that the present invention augments the database tables described in U.S. Pat. No. 6,404,884, issued on Jun. 11, 2002, by including several additional fields to support new features as discussed herein.

Database 18 can be based on any known database software and any known database format. The hardware configuration of database 18 can be any hardware platform capable of supporting the quantity of users and entries in their respective database tables. As such, database 18 can be stored on any device capable of storing the information.

Those of ordinary skill in the art can appreciate that although database 18 is shown as a single unit, it is not limited to this configuration. Database 18 can be comprised of multiple hardware units, i.e., central processing units and/or storage devices such as CD-ROMs, hard disk drives, tape disk drives, etc. which can communicate with each other across a transmission link. In addition, while only specific tables and fields within database 18 are discussed in detail, the current invention does not limit the table schema in database 18.

In accordance with one embodiment of the present invention each database in system 2 or system 2' such as database 18 or 18' stores the same information. In an alternate embodiment, it is also contemplated that database 18 can take the form of a distributed database. For example, users who are primarily based on the west coast can be supported from a portion of database such as database 18' located in California, while users primarily located on the east coast can access a portion of database such as database 18 located in New York.

In addition to listing information and other system 2 storage, database 18 also includes reference to the universal call identifier as discussed in more detail below. As call tracking through system 2 is important both for billing and internal system diagnostics, database 18 is configured to track and storing the universal call identifier for each call handled by system 2 along with any other information or call record being stored.

In addition to providing system 2 with listings for requested devices 6, supported by database 18 other services are available through System 2. For example, as illustrated in FIG. 1, a directions unit within enhanced services module 21 provides system 2 with a means to send directions to a caller 4. A directions unit is incorporated in the enhanced services module 21 used by agent application 19 running on operator terminal 20 and allows a customer service representative to retrieve directions and transmit them to caller 4.

The directions feature in enhanced services module 21 may be a stand alone unit that is configured to calculate directions based on a starting and a destination address, or other criteria as currently known in the industry. In accordance with another embodiment of the invention, enhanced services module 21 may be connected via a communications channel, for example, Internet, to a remote directions calculating unit operated by a third party such as those available by MAPQUEST™.

In other examples, it is noted that enhanced services module 21 also supports features such as providing a caller 4 with restaurant recommendations/reservations, advanced movie ticket purchase.

Closing prompt module 27 provides the closing prompt identification data that may be included in a defined field such as a closing prompt code field 58 of call completion data packet 50 as shown in FIG. 3. As mentioned, call completion data packet 50 prompts switch 12 with a command to activate the appropriate closing prompt.

Agent application 19 software then creates a call completion data packet 50. Alternatively, closing prompt module 27 or some other application could create call completion data packet 50; however, for the purposes of this discussion agent application 19 will be forming call completion data packet 50.

Wide Area Network (WAN) 25 is configured to couple all operator terminals 20 to system 2 and 2'. This includes connections between geographic locations, such that operator terminals 20 located at a call center can connect with switches 12 at other remote locations. As noted earlier and to be discussed in more detail below, because primary call center 16 may route calls to remote operator terminals 20' it is necessary that those operator terminals 20' be able to communicate back to the originating switch 12 in order to connect to the proper call. WAN 25 is configured to relay call completion data packet 50 to the appropriate switch 12 in order to complete caller 4's call.

Agent application 19, as supported by one of the operator terminals 20, communicates via operator terminals 20 to any one of the switches 12 with the combination of systems 2, 2' etc. via Wide Area Network 25 (WAN). WAN 25 allows customer service representatives at operator terminals 20 to transmit call completion data packet 50 from operator terminals 20 to any one of switches 12.

In the event that agent application 19 is unable to successfully pass call completion data packet 50 due to any number of reasons including but not limited to the unavailability of WAN 25 or the rejection of call completion data packet 50, agent application 19 can initiate call completion using in-band signaling such a DTMF. This allows agent application 19 to put the caller on soft hold and pass the destination digits to switch 12 via the same trunk. Switch 12 then accepts the digits and releases the call to primary call center 16 and initiates call completion as described hereinafter.

Another exemplary network element in system 2 is call completion table 17. Call completion table 17 allows switch 12 to select an outbound trunk group that can most efficiently route the call to the end destination. For example, if caller 4 requests a traditional directory assistance listing (i.e. a wireline business or residential listing), service provider 26 of caller 4 may prefer to complete these calls on their own network. In this case call completion table 17 would select an outbound trunk group to service provider 26 of caller 4. In the case where caller 4 requests a wireless requested device 6, it may be more desirable to complete the call via the network of the service provider 26 or requested device 6. In this case call completion table 17 would select a direct outbound trunk group to service provider 26 of requested device 6.

Call completion table 17 also allows for the programming of multiple outbound routes for each call depending on, but not limited to, the time of day, the service provider 26 of caller 4, the service provider 26 of requested device 6, corresponding rates for each service provider and time of the day and the NPA/NXX of the destination.

Regarding signaling and trunking configurations, the communication links between switch 12 and primary call center 16 (or call center 16') and the communication links between switch 12 and Mobile Switching Center (MSC) 8 can be implemented as release link trunks. In this embodiment of the current invention the communication links are released once the call completion data is transmitted to the destination end of the link. Release link trunk technology is known in the art and allows resources at the destination device to be freed by employing a predetermined signaling sequence which is recognized by the destination device as a release link signal. In addition, in another embodiment of the current invention, the communication links between switch 12 and Mobile Switching Center (MSC) 8 can be implemented as Multi-frequency MF signaling. One possible example of MF signaling is Feature Group-D (FG-D) links as commonly known in the industry.

In an alternative embodiment of the current invention, the communication links between switch 12 and Mobile Switching Center (MSC) 8 can be implemented as SS7. SS7 is a type of out-of-band signaling, as is commonly known in the industry. In another embodiment of the invention, the links between switch 12 and MSC 8 can be implemented as DTMF signaling. DTMF is a type of in-band signaling. All of these signaling choices are known in the art and are meant only as possible embodiments of the current invention but should not be seen as limiting the possible choice of communication links by which the current invention can be implemented.

As part of the call completion process, switch 12 has the ability to select the optimal trunk group to be used for the completion of caller 4 to requested device 6. For example, if switch 12 has a direct connection to the service provider 26 of requested device 6, the completion of this call would be implemented over this link.

In the case where switch 12 did not have a direct connection to the service provider 26 of requested device 6, the completion of this call would be via the PSTN 10 or the internet. This allows switch 12 to select the most cost effective means of delivering the call to requested device 6. This selection of the outbound trunk group may be determined by call completion table 17 (as shown in FIG. 1) based on information contained in call completion data packet 50. For example, the NPA.nxx of the number in the requested device information field 56 in call completion data packet 50 can be used to indicate the service provider 26 for that listing. This information is then used to determine whether a direct connection exists from switch 12 to that service provider 26. If such a direct connection exists, then the first choice route for this call would be via that link. In the event that such direct connection is not available or does not exist, an alternate route such as a connection to the PSTN 10 could be used.

The above described materials illustrate one exemplary description of the various network elements that combine to form a directory assistance system and network 2. However, this example is in no way intended to limit the scope of the present invention. Any similar directory assistance system and network 2 that employs similar network elements in a manner to provide directory assistance services is within the contemplation of the present invention.

As noted previously, each of the above described network elements may each run on one or more different protocols. In fact, in many cases, certain network elements such as switches 12, primary call centers 16 and operator terminals 20, each Of which are primary network elements in the call handling process, may operate on different protocols. A more detailed description of the communication between network elements in system 2, and communication across the various protocols is discussed in more detail below.

In one embodiment of the present invention, regarding the communication of call information between network elements in system 2, as illustrated in FIG. 2, an incoming call information record 15 is generated by switch 12, after switch 12 receives a call from caller 4.

As illustrated in FIG. 2, incoming call information record 15 contains a number of fields that may include but are not limited to: number dialed by caller field 100, preferred language code field 102, originating phone number of caller field 104 (referring to the ANI (Automatic Number Identification), caller service provider field 106, feature code field 108, and a universal call identifier field 110.

The number dialed by caller field 100 contains the number dialed by caller 4 and may be used to identify the originating switch location of the incoming call. Preferred language code field may be populated by switch 12 based on the information from field 100 or it may be based on an active selection response by caller 4.

For example, system 2, and in particular switch 12, maintains the ability to translate many different dial strings into system 2. One possibility for determining the preferred language of caller 4 is to automatically route calls from a particular dialed number, for example NPA-555-1818, directly to, for example, Spanish speaking operators. The preferred language code field 102 is used to route calls to primary call center 16 via switch 12 by way of incoming call information record 15. Originating phone number of caller field 104 (ANI) is used to assist in performing call connection at the end of the call and is also used to track the call for billing records.

Caller service provider field 106 is used to indicate the service provider of caller 4 and is also used to assist in call completion and billing recordation. Service provider field 106 also allows system 2 to identify the calling party's service provider 26 for use with various functions such as introduction prompts, closing prompts, billing information, usage tracking, etc. One example of a use of this data is to allow for the settlement of billing charges between the service provider 26 of caller 4 and service provider 26 of requested device 6.

Feature code field 108 is used to indicate if any additional system 2 features should be applied to the call. These features could include, but are not limited to: promotional rate plans, standard rate plans, bundled service plans, device capabilities and the like. For example, service provider 26 may offer unlimited directory assistance for a flat fee per month, or could offer services free for a promotional period.

Finally, universal call identifier field 110 is used to apply a universal call identifier code to the call, and to track the call information from network element to network element within system 2 as explained below. This universal call identifier, stored in field 110, is associated with the incoming call record 15 and is used to track the call throughout system 2. Once this universal call identifier is set by switch 12 it remains the same throughout the entire call pathway through system 2 regardless of the protocols operating on the various network components that the call passes. As noted above, universal call identifier field 110 is filled with a universal call identifier that is either generated by a device outside of system 2, generated by switch 12 or generated by some other network element within system 2.

Once incoming call information record 15 is generated by switch 12, the call is forwarded to primary call center 16 for distribution to the appropriate operator terminal 20 to handle the call. Each of the various network elements operates with one another according to the above detailed description. Once the requested device 6 information is obtained by operator terminal 20 via database 18 or another source within system 2, call completion data packet 50 is assembled. As noted above, throughout this entire call pathway through system 2, the universal call identifier assigned by switch 12 and placed in universal call identifier field 110 is the same, regardless of the operating protocols of the network elements on which the call passes.

In one embodiment of the present invention, as illustrated in FIG. 3, call completion data packet 50, comprised of multiple data fields, is configured to provide additional call pathway information between network elements within system 2. These fields can include but are not limited to the originating phone number of the caller field 54 (caller 4 ANI), the requested device information field 56, closing prompt code field 58, pre-announcement field 59 and call completion universal call identifier field 60.

Call completion data packet 50 is formed by agent application 19 at operator terminal 20 using information from incoming call information record 15, database 18, and closing prompt module 27. This information is then organized and used to populate the fields of call completion data packet 50. This call completion data packet 50 assists network elements, within system 2, to ensure call completion to requested device 6.

The originating phone number field 54 is the originating phone number of caller 4. The requested device information field 56 is the requested listing of the subscriber. This information may be provided to operator terminal 20 by the retrieved listing from database 18. The requested device information field 56 identifies the proper destination for the completed call. This information is used to properly connect caller 4 to requested device 6.

Closing prompt code field 58 of call completion data packet 50 contains instructions on which closing prompt to retrieve, use and play for caller 4. Pre-announcement field 59 of call completion data packet 50 denotes to the Voice Response Unit (VRU) whether or not the pre-announcement feature is activated. If the pre-announcement feature is activated the VRU will announce caller 4's identity to requested device 6 by either voice or text message so that requested device 6 can determine whether or not to accept the call.

Call completion universal call identifier field 60 is reserved for storing the universal call identifier associated with the call, taken from universal call identifier field 110 of incoming call information record 15. Again this field is used to store the same universal call identifier, assigned to the call by switch 12 in order to track it throughout the call completion process in system 2. This ensures that not only the network elements used in responding to caller 4 are provided access to the universal call identifier information, but also the network elements utilized during call completion are provided with the same universal call identifier. In some cases these network elements may be the same, such as is the case for switch 12.

When combined, the originating phone number of caller 4 field 54, the requested device information field 56, the closing prompt code field 58, pre-announcement field 59 and call completion universal call identifier field 60 contain all of the information needed to initiate and complete the call, play the appropriate closing and pre-announcement, and track the call through all of the network elements of system 2, for storage and billing requirements.

In one embodiment of the present invention, universal call identifier field 60 in call completion data packet 50 can be used for additional call completion tasks. For example, as switch 12 is preparing to complete the call, system 2 may desire to send a closing prompt to caller 4, from closing prompt module 27, asking if the caller would like the results sent via text to the device of caller 4, in addition to the requested device 6 contact information being read by VRU/switch 12.

In such an instance, because the UCI is present in call completion data packet 50, system 2 can use the UCI to trace the call back through the network elements, as explained above, and offer the additional text delivery to caller 4 without having to perform additional steps. Each network element within system 2 may keep a record of a performed function, relating to a performed service associated with a call. This record is associated with the unique UCI for that call.

For instance, in accordance with one embodiment of the present invention, when information related to a requested device 6 is retrieved, database 18 generates a record of the retrieve function. This record is associated with the same UCI as the one contained in universal call identifier field 110 of incoming call record 15.

As such, because a record already exists with the requested device 6 contact information with the call UCI attached, if caller 4 selects to receive the text data as well, system 2 can use the UCI from call completion UCI field 60 of call completion data packet 50 to search for, retrieve and deliver the data for the requested device 6. This data can be delivered as a standard text data (WAP, SMS, e-mail, etc.) or, alternatively, the text data may be sent so as to directly populate an address/telephone number field in the software on the device of caller 4, such as with a V-card, where the data is sent in a pre-formatted manner compatible with software in the device of caller 4.

In another example, the UCI field 60 in call completion data packet 50 can be used similarly by switch 12 and closing prompt module 27 to provide additional data delivery to caller 4, such as text delivery of stored directions or generation of new directions. As described above, enhanced service module 21 maintains a function of generating directions to the location of a requested device 6 to be given by the customer service representative to caller 4. Upon call completion, caller 4 may be prompted with a closing prompt to have the directions to the requested device 6 also sent via some form of text message (SMS, e-mail etc. . . .). As described above, when directions are requested, enhanced services module 21 generates a record of the directions and stores them with an associated UCI for the call. This record is associated with the same UCI as the one contained in universal call identifier field 110 of incoming call record 15.

Again, using the UCI from call completion universal call identifier field 60, system 2, can go directly to the stored data in network elements (enhanced directory assistance module 21 or database 18), using the associated UCI, and have the correct stored directions delivered to the correct caller 4.

In an alternative arrangement a caller 4 may simply request a listing for requested device 6. At call completion, VRU 12 and closing prompt module 27 may ask caller 4 if they would also like directions to requested device 6 (when applicable such as requested wireline information associated with a home or business address). If so, system 2, using the UCI in call completion data packet 50 can retrieve the store transaction from either database 18 or operator terminal 20 and forward that information on to enhanced service module 21 for directions formulation, which can be delivered by text in the manner described above.

Yet another example, the UCI field 60 in call completion data packet 50 can be used by switch 12 to provide text delivery of reservation receipts/confirmation. As described above, enhanced service module 21 also maintains functions such as obtaining reservations for restaurants. As with directions, enhanced service module 21 stores a record of the transaction and associates that record with the same UCI as the one contained in universal call identifier field 110 of incoming call record 15.

Upon call completion, caller 4 may be prompted with a closing prompt to have the a receipt/confirmation sent via some form of text message (SMS, e-mail etc. . . .) to the device used by caller 4. Using the UCI from call completion universal call identifier field 60, system 2, can directly tap into the stored data in network elements (also enhanced directory assistance module 21 or database 18 in this case), and use the associated UCI, to have the stored reservation transaction delivered in a text format to caller 4. Alternatively, caller 4 may request that the reservation/confirmation be used to populate an application in the device of caller 4 such as a calendar application.

In the above descriptions it is noted that incoming call record 15 and call completion data packet 50 both contain fields that maintain a universal call identifier (110 and 60 respectively). However, it is understood that there is a single universal call identifier associated per incoming call to system 2. Thus, for any given call to system 2, the universal call identifier stored in these fields is identical. The universal call identifier is included in both incoming call record 15 and call completion data packet 50 so that the call is certain to be tracked through each of the network elements that handle the call.

It is further contemplated that it is possible to place the universal call identifier in just one of either the call record 15 or call completion data packet 50 if such an amount of data is sufficient for tracking the call through system 2. However, for the purposes of illustration, system 2 is described herein where both call record 15 and call completion data packet 50 both contain fields for storing the universal call identifier.

In view of the above described network elements for directory assistance system network 2, incoming call record 15 and call completion data packet 50, it is shown the basic elements for receiving a call from caller 4, providing directory assistance to that caller 4 and connecting them in many instances to requested device 6.

As noted above, during this process the call pathway from caller 4, through MSC 8, through system 2, and potentially out to requested device 6, encounters a number of network elements, each of which may be operating on different protocols. However, system 2 administrators, for a number of reasons, need to track the call pathway through the various network elements within system 2.

One such reason for tracking each leg of the call is to perform internal system diagnostics such as to determine traffic on a particular network element, check for problems with an element etc. . . Another reason for tracking call pathways, or even a particular call pathway, is to check for quality assurance, measuring response times and other customer satisfaction criteria.

Yet another reason for administrators to trace call pathways or a particular call pathway, through the network elements of system 2 is for checking billing issues. Although dropped calls are becoming a less frequent occurrence, mobile callers 4 and requested devices 6 and their associated MSCs 8 occasionally lose calls for one reason or another. However, when dropped calls occur during a directory assistance request, MSCs 8 reimburse caller 4 for the minutes used. MSCs 8 in turn charge directory assistance systems for the dropped call.

In such situations, it is advantageous for administrators of system 2 to track the call pathway through the network elements of system 2 to determine if the call drop was due to an internal error or if it was the fault of an external party such as the service provider for either caller 4 or requested device 6.

In a first embodiment of the present invention, a first method for tracing a call pathway through the network elements of system 2 is provided using the ANI of caller 4. Originating number of caller field 104 of incoming call record 15 and originating phone number of caller field 54 in call completion data packet 50 both track the ANI of caller 4 through all of the network elements of system 2. Each of the network elements in turn maintain records of the call that pass through themselves on their way to other network elements within system 2.

This can serve as a useful tool to track a call flow through system 2 to trouble shoot a call. For example, when a call is dropped for a certain caller 4 at a certain time, the combination of this information can be used to trace the call through the network elements of system 2 to determine which network element failed to properly transfer the call.

For example, if switch 12 has a record of a call at the correct time and for the correct ANI, and the primary call center 16 shows the same call time and same ANI, but the operator terminal 20 records do not show a call at that time (the call drop time) for that ANI, then call drop can be narrowed down to an error in communication between primary call center 16 and operator terminal 20.

On the other hand, if the records contained on the network elements contain an entry for the appropriate time and for the correct ANI, then it is determined that the error that caused the call drop happened outside of the network elements of system 2. In such a case, system 2 can be shown to not be responsible for caller 4's call drop.

However, when using this manner of tracing call pathways through the network elements of system 2, careful attention must be paid to the ANI of caller 4 for privacy concerns. In many cases, a caller 4 ANI is considered restricted, a fact generally recorded by their service provider 26, and can not be used reliably to trace call pathways.

In such an instance, it is then necessary to place a flag data in either or both of originating number of caller field 104 of incoming call record 15 and originating phone number of caller field 54 in call completion data packet 50. The notation or marking flag can either be used to mark restricted caller 4 ANIs or it is used to mark unrestricted caller 4 ANIs, provided that the two groups are separately and readily identifiable from the notation or markings.

This notation or record can be stored in either database 18, in billing record database 14, or any other available recording/storage database device within system 2.

Using the above example, when a call is dropped during directory assistance, system administrator for system 2 is provided with a call drop time and an ANI from the service provider 26 of caller 4. The system administrator first consults the stored information regarding the notation or marking in the originating number of caller field 104 of incoming call record 15 and originating phone number of caller field 54 in call completion data packet 50. If the ANI of the call pathway to be traced is marked or flagged as unrestricted, then the call pathway may be traced according to the above description to determine if the call drop was a result of a failure of communication between network elements within system 2, or if the call drop was a result of an error by one of service providers 26. If one the other hand, the administrator finds that the ANI of the dropped call of call 4 is restricted, then the call flow tracking is not performed using the ANI.

Thus, the above described notation or marking of the caller ANI fields in incoming call record 15 and call completion data packet 50 can be used to assist system administrators in performing call pathway tracking for lost or dropped calls. However, as noted above, some call pathways with restricted ANIs can not be traced by this method. Also there are situations where group customers such as corporate accounts handled by the service provider 26, may have numerous calls, all using the same ANI, thus making call pathway analysis difficult when performed in this manner.

In another embodiment of the present invention, a second method for tracing a call pathway through the network elements of system 2 is provided using the universal call identifier assigned to a particular call. Universal call identifier field 114 of incoming call record 15 and call completion universal call identifier field 60 in call completion data packet 50 both track the universal call identifier of caller 4 through all of the network elements of system 2.

This can serve as a useful tool to track a call pathway through system 2 to troubleshoot a call. As noted above, the universal call identifier provided to each call is unique for that caller 4 ANI and for that time. Using the universal call identifier allows a system administrator to trace a call pathway through the network elements of system 2 in order to determine if a call drop occurred between network elements within system 2 or if the call drop was a result of external call problems.

Figure 4:
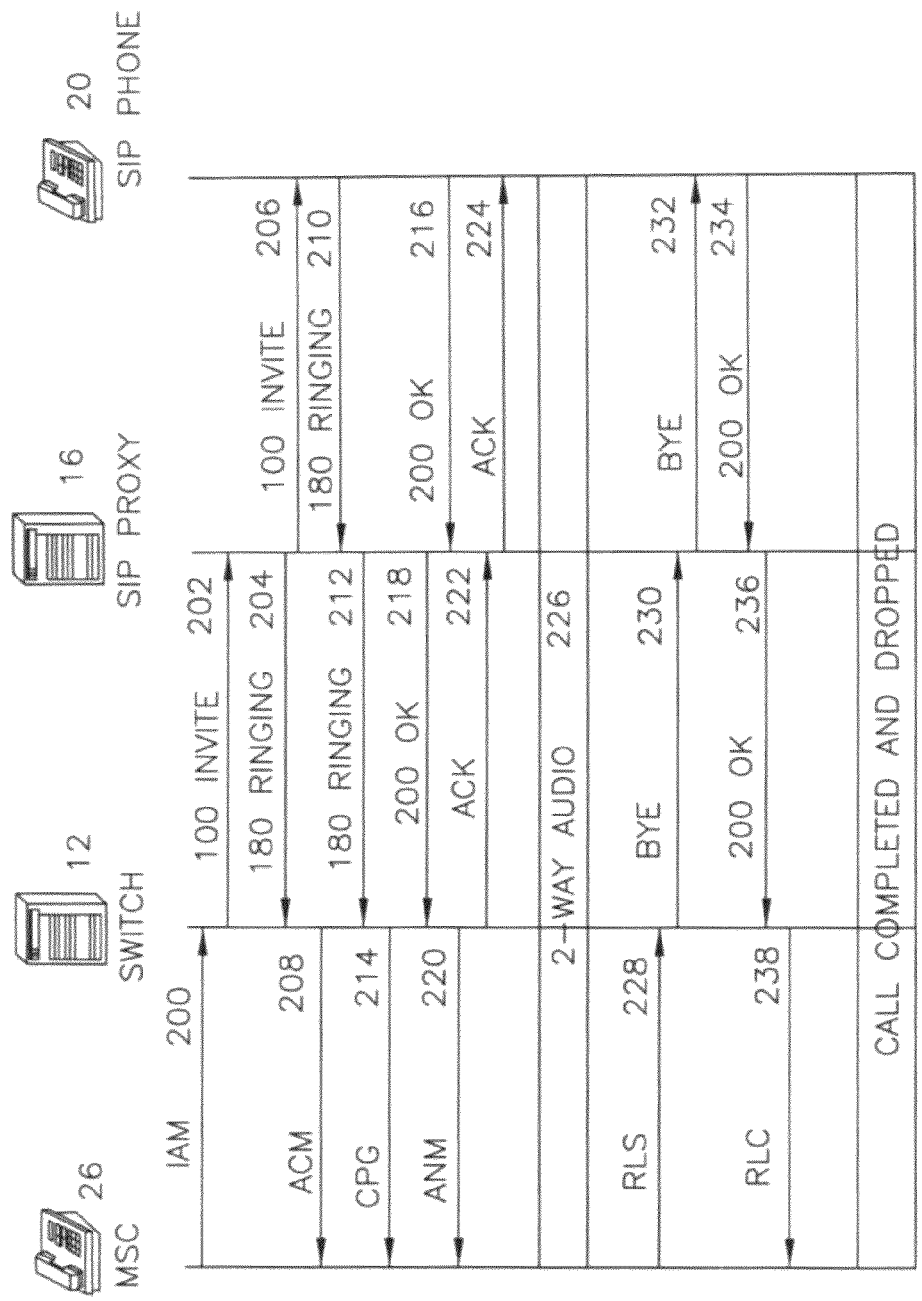
FIG. 4 is call flow operation diagram of a directory assistance call through the directory assistance system of FIG. 1, in accordance with one embodiment of the present invention.

As illustrated in FIG. 4, a typical flow call through the network elements of system 2 is shown for a directory assistance call from caller 4, being connected to a requested device 6. As illustrated the call flow begins when caller 4, through their MSC 8 contacts system 2 for directory assistance. The call is received in system 2 at switch 12 where it is processed and delivered to primary call center 16 for distribution to a particular operator terminal 20 where the call is handled by the customer service representative.

In this situation, at step 200, a call originates at MSC 8, where the initial address message is sent to switch 12 in system 2. At this step, incoming call record 15 is first generated by switch 12 for routing the call within system 2. MSC 8, operating on a typical protocol, such as SS7 or any other telephony protocol, sets an initial universal call identifier when it receives the call and routes it to system 2.

When generating initial call record 15, rather than switch 12 applying a new universal call identifier according to its own protocol, switch 12 continues to use the universal call identifier transmitted from MSC 8.

It is contemplated that system 2 controls the network element settings whereby network elements such as switch 12, primary call center 16 and operator terminals 20, rather than attaching their own universal call identifiers to a call record according to their own protocol, are set to accept the incoming universal call identifier from the incoming call record 15 in a master/slave relationship.

In such a case, network elements within system 2 have their functions concerning the universal call identifier set to slave setting whereby they will simply accept outside universal call identifiers (from record 15). The universal call identifier settings from MSC 8 are designated as the master in this arrangement, so that UCI will be consistent not only throughout all of the network elements within system 2, but also the UCI will be consistent with the carrier's call information making call record correlation easier when performing troubleshooting.

To support this feature, the manufacturers of network elements preferably incorporate a field in their equipment's MMI (Man Machine Interface) to either be slave or master for the UCI. If master, then the network element pushes the original protocols UCI to the next protocol UCI. If the network element is set to slave, then it uses the incoming UCI for all subsequent messages.

Such a universal call identifier, universal to all protocols, would preferably be approximately 20 characters, chosen from all alphanumeric and symbol characters, thus providing a large amount of possible universal call identifiers capable of assigning a new UCI to each and every call passing through system 2. In such an instance, the operating protocols working on the network elements are adapted so that the universal call identifier generated by MSC 8 is equally valid and understandable by all of the other protocols operating on the network elements of system 2.

It is noted that even if the UCI is not standardized across all telephony equipment including the MSCs 8, the administrators of system 2 may simply arrange that their own network elements be configured to accept the incoming UCI, in a slave arrangement, regardless of whether or not the UCI is in a standardized format suitable to all protocols.

Regardless of the arrangement used to have the same UCI accepted by all network elements, the UCI assigned for any particular call, is selected by switch 12 to populate incoming call record 15. As such, switch 12 populates universal call identifier filed 110 of incoming call record 15, from either the universal call identifier from an outside equipment (such as MSC 8 when in the slave arrangement outlined above), it may generate a UCI of its own in a master arrangement, or it may allow another network element within system 2 to generate the universal call identifier. For the purposes of illustration in this example, switch 12 uses the UCI provided from MSC 8.

Next, at step 202, switch 12 sends an invite call message to primary call center 16, operating in this example as an SIP proxy call distribution network element. At step 204, the invite is acknowledged by ring tone sent back to switch 12 and, at step 206, the call invite is passed onto operator terminal 20.

At both steps 204 and 206, and indeed for every leg of the call within system 2, switch 12 generates a Call Detail Record (CDR) or Session Detail Record (SDR). Each CDR or SDR for each leg of the call is generated independently. However, incoming call record 15 includes the same universal call identifier as initially incorporated when record 15 was generated.

Additionally, like switch 12 described above, both primary call center 16 and operator terminal 20 both accept the universal call identifier for their records but do not impose their own UCI on the call, even though they are operating on different operating protocols. Thus, the CDR or SDR stored for each call leg within system 2, includes the same UCI as it was encoded into UCI field 110 of incoming call record 15.

At step 208, the message acknowledgement is sent to MSC 8. At step 210 the operator terminal 20 delivers the ring tone to primary call center 16 and at step 212 the ring tone is advanced onto switch 12, which in turn, at step 214 sends a call progressing signal to MSC 8.

At step 216, operator terminal 20 sends an OK message to primary call center 16 indicating that operator terminal 20 has accepted the call. Next, at step 218, primary call center 16 transfers this message to switch 12, and, at step 220, the formal acknowledgement is sent from switch 12 to MSC 8. It is again noted that the universal call identifier contained in universal call identifier field 110, is used throughout this call pathway, still using the unique initial universal call identifier generated by MSC 8 and assigned into record 15 by switch 12, resulting in the CDR or SDR generated by switch 12 for each of these call legs.

Once switch 12 sends the formal acknowledgement message to operator terminal 20 it then, at step 222, passes a second acknowledgement on to primary call center 16, which in turn continues to pass on the acknowledgement to operator terminal 20 at step 224. At step 226, 2 way voice communication is then established between caller 4 and the customer service representative at operator terminal 20.

At this point caller 4 may verbally request the desired listing for requested device 6. It is understood that operator terminal 20 may be an automated system, whereby communications from caller 4 are handled in automated manner, as discussed above. It is also noted that the communication may be handled by a live customer service representative but entirely in text format (SMS, for example) if such a format is supported by the device used by caller 4.

Once caller 4 receives the necessary information they either hang up or are connected directly to requested device 6 by switch 12. At this point, call completion data packet 50, used to connect the call to requested device 6, is completed including the addition of call completion universal call identifier field 60 which now contain the identical universal call identifier that was originally assigned into incoming call record 15, back in step 200.

In either event, when the call is completed, MSC 8 delivers a notification to release trunk signal to switch 12 at step 228. At step 230, switch 12 notifies primary call center 16 of the signal, and, at step 232, this signal is transmitted to operator terminal 20. Once receiving the notification of the release trunk signal, at step 234, operator terminal 20 sends an acknowledgement signal back to primary call center 16, which is then transferred to switch 12 at step 236. At step 238, switch 12 sends the release trunk signal to the MSC 8, dropping the call and ending two-way audio between caller 4 and operator terminal 20.

Thus, through each of these steps in the above described example, each of the network elements of system 2, operating in the above steps, uses the same universal call identifier, stored in incoming call record 15 and call completion data packet 50, for each leg of the call. The generated CDR or SDR in switch 12 for each of the call legs within system 2 then reflects this UCI. This same universal call identifier is used and may be stored in each of the network elements, and in particular the CDRs or SDRs of switch 12 for each call in system 2, regardless of their operating protocols.

The above example uses the initial universal call identifier from MSC 8, operating on SS7 protocol. And, even though primary call center 16 (SIP proxy) is operating on a different protocol, it still accepts, stores and passes on universal call identifier from universal call identifier field 110 of incoming call record 15.

It is contemplated that various protocols including but not limited to PRI, SS7, SIP, H.323, MGCP, RSVP, DTMF, IAX and IAX2, Megaco, IMAP, LDAP, SMTP, WAP, IS-41, ATM transport medium or any other protocols that are used or may be developed for use on network elements, including telephony network elements and IP network elements, all of which operate in accordance with connectivity outlined above.

The resultant system and method employs a single universal call identifier for each call through system 2. By using this single universal call identifier for each call, a system administrator can track a call pathway through the network elements of system 2, without resorting to tracking via the ANI of caller 4.

Thus, for example, when a call is dropped for a certain call at a certain time, the universal call identifier is used to trace the call pathway through the network elements of system 2 to determine which network element failed to properly transfer the call. So if switch 12 has a record of the universal call identifier for a particular call, and the primary call center 16 shows the same universal call identifier, but the operator terminal 20 records do not show the universal call identifier, then the cause for the call drop can be narrowed down to an error in communication between primary call center 16 and operator terminal 20.

On the other hand, if the records of all of the network elements contain an entry for the appropriate universal call identifier being analyzed for the dropped call, then it is determined that the error that caused the call drop happened outside of the network elements of system 2. It is noted that the UCI can be tracked for these purposes using the records contained in the various network elements, or it may be tracked using the CDRs or SDRs for each call leg as stored in switch 12 or even using a combination of both.

When using this manner of call pathway tracing through the network elements of system 2, every single call that proceeds through system 2, can be traced to determine whether a call drop occurred between the network elements or if it occurred outside system 2. This call pathway tracing can be performed even in cases where the ANI of caller 4 is restricted or when multiple calls are passed to system 2 via the same ANI (such as in corporate number situations).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for operating a directory assistance system having a plurality of different network elements, at least two of which are operating on different protocols, said method comprising the steps of:
    receiving, at a first network element operating on a first operating protocol, an incoming communication from a requester for directory assistance;
    initiating a communication session with said requester to provide said directory assistance;
    assigning by said first network element a universal identifier data to said communication session;
    during said communication session, transmitting said communication to a second network element, operating on a second operating protocol, said transmission including said universal identifier data,
    wherein said second network element is configured to accept said universal identifier data set by said first network element; and
    generating a record of the exchange of the communication between at least said first and second network elements based on said assigned universal identifier data.

2. The method as claimed in claim 1, wherein said universal identifier data is assigned using an identifier data generated by a carrier for the incoming communication.

3. The method as claimed in claim 2, wherein said first network element, operating on said first protocol, has a UCI command set to an accept setting, whereby it is configured to receive the incoming universal identifier data from said carrier of said call onto said second network element operating on said second protocol.

4. The method as claimed in claim 3, wherein said second network element, operating on said second protocol, has a UCI command set to an accept setting, whereby it is configured to receive the incoming universal identifier data from said first network element.

5. The method as claimed in claim 1, wherein said first network element is a telephone switch.

6. The method as claimed in claim 5, further comprising the step of said switch inserting said assigned universal identifier data into an incoming, call information record for propagation through system 2.

7. The method as claimed in claim 6, wherein said generated record of the exchange of the communication between said switch and said second network element based on said assigned universal call identifier data is stored in said switch.

8. The method as claimed in claim 7, further comprising the step of generating record of the exchange of the communication between said second network element and a third network element, based on said assigned universal identifier data and storing said record in said switch.

9. The method as claimed in claim 7, wherein said record stored in said switch is stored in a CDR (Call Record Detail) or an SDR (Session Record Detail).

10. The method as claimed in claim 1, wherein said generated record of the exchange of the communication between said first and second network elements based on said assigned universal identifier data is stored in said network element that conducts said exchange.

11. The method as claimed in claim 1, wherein said first operating protocol and said second operating protocol, are different from one another and each may be any one of PRI, SS7, SIP, H.323, MGCP, RSVP, DTMF, IAX and IAX2, Megaco, IMAP, LDAP, SMTP, WAP, IS-41 and ATM transport medium.

12. The method as claimed in claim 1, further comprising the step of using said record to trace a call pathway though said network elements of said directory assistance system in order to determine the cause of a dropped call.

13. The method as claimed in claim 1, further comprising the step of initiating a secondary step upon call completion, said secondary step utilizing said record of the exchange to provide said caller with either additional information or additional services.

14. The method as claimed in claim 13, wherein said secondary step is to provide said requester with an electronic/text copy of a listing requested by said requester, wherein said universal identifier data is used to retrieve said record of the exchange so as to obtain said electronic/text copy of said requested listing.

15. The method as claimed in claim 13, wherein said secondary step is to provide said requester with an electronic/text copy of a stored directions by said requester, wherein said universal call identifier data is used to retrieve said record of the exchange so as to obtain said stored directions.

16. The method as claimed in claim 13, wherein said secondary step is to provide said requester with a directions to a requested listing, wherein said universal identifier data is used to retrieve said record of the exchange so as to obtain said requested listing, allowing said system to calculate the requested directions.

17. The method as claimed in claim 13, wherein said secondary step is to provide said requester with an electronic/text copy of a stored reservation or ticket produced by said system, wherein said universal call identifier data is used to retrieve said record of the exchange so as to obtain said stored reservations or ticket.

18. The method as claimed in claim 13, wherein data delivered via said secondary step is pre-formatted to be directly input into an application supported by a device used by said requester to connect to said system.

19. A system for handling directory assistance communications, said system comprising:
  a first network element configured to receive an incoming communication from a requester seeking directory assistance, in response to which said system initiates a communication session with said requester to provide said directory assistance, said first network element of said system assigning a universal identifier data to said communication;
  a second network element, configured to receive said directory assistance request through said communication session, from said first network element, and wherein said second network element accepts said universal identifier data, assigned by said first network element of said system; and
  a storage means configured to store a record of said communication session between at least said first and second network elements based on said assigned universal identifier data.

* * * * *